United States Patent
Collin et al.

[11] Patent Number: 6,066,582
[45] Date of Patent: *May 23, 2000

[54] PROCESS FOR MAKING SILICON NITRIDE CUTTING TOOL MATERIAL

[75] Inventors: Marianne Collin, Skarpnäck; Magnus Ekelund, Järna, both of Sweden

[73] Assignee: Sandvik AB, Sandviken, Sweden

[*] Notice: This patent issued on a continued prosecution application filed under 37 CFR 1.53(d), and is subject to the twenty year patent term provisions of 35 U.S.C. 154(a)(2).

[21] Appl. No.: 09/232,008

[22] Filed: Jan. 14, 1999

Related U.S. Application Data

[62] Division of application No. 08/880,297, Jun. 24, 1997, Pat. No. 5,914,286.

[30] Foreign Application Priority Data

Jul. 19, 1996 [SE] Sweden ................................. 9602828

[51] Int. Cl.$^7$ .................... C04B 35/594; C04B 35/596
[52] U.S. Cl. .................... 501/97.2; 501/97.4; 264/683
[58] Field of Search .................... 501/97.2, 97.4; 264/683

[56] References Cited

U.S. PATENT DOCUMENTS

| | | |
|---|---|---|
| 4,497,228 | 2/1985 | Sarin et al. . |
| 5,091,347 | 2/1992 | Pyzik et al. . |
| 5,120,328 | 6/1992 | Pyzik . |
| 5,160,508 | 11/1992 | Pyzik et al. . |
| 5,188,645 | 6/1992 | Pyzik et al. . |
| 5,238,884 | 8/1993 | Sakai et al. . |
| 5,312,785 | 6/1994 | Pyzik et al. . |
| 5,312,788 | 5/1994 | Li et al. . |
| 5,369,065 | 11/1994 | Yoshimura et al. . |
| 5,382,273 | 1/1995 | Mehrotra et al. . |
| 5,399,536 | 5/1995 | Yamakawa et al. . |
| 5,424,256 | 6/1995 | Yoshimura et al. . |
| 5,432,132 | 7/1995 | Dagsgupta et al. . |
| 5,439,856 | 8/1995 | Komatsu et al. . |
| 5,618,768 | 4/1997 | Higuchi et al. . |
| 5,668,069 | 9/1997 | Sato et al. . |
| 5,744,410 | 4/1998 | Komatsu et al. . |

FOREIGN PATENT DOCUMENTS

| | | |
|---|---|---|
| 0071997 | 2/1983 | European Pat. Off. . |
| 3840171 | 5/1990 | Germany . |

*Primary Examiner*—Karl Group
*Attorney, Agent, or Firm*—Burns, Doane, Swecker & Mathis, L.L.P.

[57] ABSTRACT

The ceramic cutting tool material according to the present invention comprises a beta silicon nitride matrix with total amount of 0.5–10 weight %, preferably 0.5–6 weight %, of an intergranular phase and 0.05–3 weight % of at least one secondary crystalline phase of a transition metal carbide, nitride, carbonitride and/or silicide present as spherical particles with a size of 0.1–2 $\mu$m, preferably submicron (0.01–1 $\mu$m). The transition metal is preferably niobium and/or tantalum. The material has less than 1 volume %, preferably less than 0.3 volume %, porosity. The beta silicon nitride grains are to at least 10%, preferably more than 20%, elongated with an aspect ratio greater than 3, preferably greater than 5. The grain diameter of the beta silicon nitride grains is in the range of 0.2–10 $\mu$m, preferably 0.2–5 $\mu$m, and most preferably 0.2–3 $\mu$m.

13 Claims, 1 Drawing Sheet

PROCESS FOR MAKING SILICON NITRIDE CUTTING TOOL MATERIAL

This application is a divisional of Application Ser. No. 08/880,297, filed June 24, 1997, now U.S. Pat. No. 5,914,286.

BACKGROUND OF THE INVENTION

The present invention relates to a silicon nitride cutting tool with improved properties for metal cutting applications in cast iron.

Silicon nitride has been recognized as a cutting tool material for machining of cast iron due to its good wear resistance and good high temperature properties. During the last decade, the development of the material has led to an increased use in metal cutting applications and with more advanced silicon nitride material with improved properties, the potential will grow.

In U.S. Pat. No. 5,382,273, a silicon nitride based ceramic material for a cutting tool is described. The material is a beta silicon nitride with less than 5 weight % of an intergranular phase consisting of magnesia and yttria. This material is disclosed to have improved metal cutting performance, improved hardness at 1000° C., good transverse rupture strength and improved Weibull modulus compared to prior art.

Pyzik et al. have described in a number of patents a self-reinforced silicon nitride that exhibits high fracture toughness and high fracture strength. In U.S. Pat. No. 5,312,785, a process of producing a self-reinforced silicon nitride comprising a glassy phase, a second crystalline phase of zirconium oxide and a crystalline phase of a metal zirconium silicide and/or metal zirconium silicon nitride is described. In U.S. Pat. No. 5,160,508, a self-reinforced silicon nitride ceramic of high fracture toughness is described. The material contains a i) crystalline beta silicon nitride phase with at least 20 volume % of the beta silicon nitride in the form of whiskers having an aspect ratio greater than 2.5, a glassy second phase containing ii) densification aid; iii) conversion aid; iv) an aid which enhances the growth of beta silicon nitride whisker; and v) silica. U.S. Pat. No. 5,120,328 describes a method of manufacturing dense self-reinforced silicon nitride by pressureless or low pressure gas sintering. The silicon nitride body comprises at least 20 volume % beta silicon nitride whiskers, 2–10 weight % of a glassy phase, 0.5–5 weight % of a second crystalline phase of zirconium oxide and optionally 0.1–3 weight % of a crystalline phase of a metal zirconium silicide and/or metal zirconium silicon nitride. In U.S. Pat. No. 5,118,645, a process of preparing a silicon nitride body from a powder mixture of silicon nitride and densification, conversion, whisker enhancing and Palmqvist toughness enhancing aids is described. U.S. Pat. No. 5,091,347 describes a process for preparing a silicon nitride from a mixture of i) silicon nitride and ii) silicon dioxide as densification aid; iii) a conversion aid; and iv) a whisker growth enhancing aid at sintering temperatures above 1750° C. and pressures of at least 20.7 MPa.

In U.S. Pat. No. 4,497,228, an abrasion resistant silicon nitride is described. This is achieved by adding up to 60 volume % of hard particles of refractory metal carbides and nitrides or combinations thereof.

OBJECTS AND SUMMARY OF THE INVENTION

It is an object of this invention to avoid or alleviate the problems of the prior art.

It is the object of this invention to show that by using a relatively small amount of sintering aids and by in situ formation of secondary crystalline phases of carbide, nitride, carbonitrides or suicides that lower the amount of glassy intergranular phase in the final product and increase the wear resistance, a material with good fracture toughness, thermoshock resistance and wear resistance can be manufactured.

In one aspect of the invention there is provided a silicon nitride cutting tool insert comprising a beta silicon nitride matrix with a total amount of 0.5–10 weight % of an intergranular phase and 0.05–3 weight % of at least one in situ formed secondary crystalline phase of a transition metal carbide, nitride, carbonitride or silicide present as spherical particles with a size of 0.1–2 μm and wherein the beta silicon nitride grains are to at least 10% elongated with an aspect ratio greater than 3, with a grain diameter in the range of 0.2–10 μm and less than 1 volume % porosity.

In another aspect of the invention there is provided a silicon nitride cutting tool insert comprising a beta silicon nitride matrix with a total amount of 0.5–6 weight % of an intergranular phase and 0.05–3 weight % of at least one in situ formed secondary crystalline phase of a transition metal carbide, nitride, carbonitride or silicide present as spherical particles with a size of submicron (0.01–1 μm) and wherein the beta silicon nitride grains are to at least 20% elongated with an aspect ratio greater than 5, with a grain diameter in the range of 0.2–5 μm and less than 0.3 volume % porosity.

In yet another aspect of the invention there is provided a method of making a silicon nitride cutting tool insert by powder metallurgical methods comprising preparing a silicon nitride slurry by wet dispersion in water or an organic solvent of silicon nitride powder with powders of yttrium oxide 0.1–5 weight %, aluminum oxide 0.1–5 weight % and transition metal oxides, prefeably niobium oxide or tantalum oxide or mixtures thereof in an amount of 0.1–5 weight % whereby the total sum of added oxides is less than 6 weight % and dispersing agents optionally together with suitable pressing aids whereafter the slurry is dried and granulated to a powder which is formed to a cutting tool insert of a desired shape and sintered using a pressure assisted sintering technique.

BRIEF DESCRIPTION OF THE DRAWINGS

The FIGURE shows a transmission electron microscopy (TEM) micrograph in about 10,000× magnification of the microstructure of a silicon nitride material according to the invention. The grey spherical and elongated grains are beta $Si_3N_4$ and the black spherical grains are $NbSi_2$.

DETAILED DESCRIPTION OF THE PREFERRED EMBODIMENTS OF THE INVENTION

Figure 1:

The present invention relates to a silicon nitride based cutting tool insert for chipforming machining of cast iron material having improved mechanical, chemical and wear properties. This is obtained by addition of one or more transition metal oxides from Group IVa, Va and VIa, which act as a sintering aid together with alumina and yttria and also promote the growth of elongated grains of beta silicon nitride. The transition metal also forms small particles of a secondary crystalline phase of transition metal-nitride, -carbide, -carbonitride or -silicide during sintering.

The ceramic cutting tool material according to the present invention comprises a beta silicon nitride matrix with a total amount of 0.5–10 weight %, preferably 0.5–6 weight %, most preferably 0.5–4 weight %, of an intergranular phase and 0.05–3 weight %, preferably 0.3–2 weight %, of at least one secondary in situ formed crystalline phase of a transition metal carbide, nitride, carbonitride and/or silicide, preferably a carbonitride and/or silicide, present as spherical particles with a size of 0.1–2 µm, preferably submicron (0.01–1 µm). The transition metal is preferably niobium and/or tantalum. The material has less than 1 volume %, preferably less than 0.3 volume %, porosity. The intergranular phase can be regarded as an amorphous phase with a variable composition depending on the raw materials. It is oxide based but it can also to some extent dissolve nitrogen and carbon. The beta silicon nitride grains are to at least 10%, preferably more than 20%, elongated with an aspect ratio greater than 3, preferably greater than 5. The grain diameter of the beta silicon nitride grains are in the range of 0.2–10 µm, preferably 0.2–5 µm, and most preferably 0.2–3 µm.

The material according to the invention is manufactured by powder processing followed by sintering. A silicon nitride slurry is manufactured by wet dispersion of the silicon nitride together with suitable amounts of additives in water or an organic solvent. The additives for the intergranular phase are yttrium oxide 0.1–5 weight %, preferably 0.2–3 weight %, most preferably 0.5–2 weight %, aluminum oxide 0.1–5 weight %, preferably 0.2–3 weight %, most preferably 0.2–2 weight %, and transition metal oxides, preferably niobium oxide or tantalum oxide or mixtures thereof in amount of 0.1–5 weight %, preferably 0.2–3 weight %, most preferably 0.5–2 weight %. In some cases, $SiO_2$ is also added in an amount less than 1 weight %, preferably 0.1–0.7 weight %. The total sum of added oxides should however, preferably be less than 6 weight %, and most preferably less than 4 weight %, however it should be more than 0.5 weight %, preferably more than 1 weight %. The added aluminum oxide should preferably be present in the intergranular phase and not form a solid solution with the silicon nitride. It might also be possible to use other transition metal compounds that in situ will form small spherical particles of nitrides, carbides, carbonitrides or silicides that also increase the wear resistance. Suitable dispersing agents are added possibly together with suitable pressing aids (organic additives). The slurry is then dried and granulated.

The granulated powder is then formed into a body with a shape and a size which, after sintering, will result in the desired shape and size using either uniaxial pressing or isostatic pressing. The relatively low amount of intergranular phase makes it necessary to use a pressure assisted sintering technique such as hot press (HP), gas pressure sintering (GPS) or hot isostatic pressure (HIP). The amount of formed intergranular glassy phase should however, be high enough so that the material reaches essentially full density during the chosen sintering process. This applies in particular, to the GPS sintering process. When hot press technique (uniaxial pressure sintering) is used, no pressing aids are needed and the granulated powder is filled into a hot press graphite die and then hot pressed. In the case of GPS and HIP technique, pressing aids are usually used and they are removed by a heat treatment at a temperature in the range of 400–800° C. and in a suitable heat treatment atmosphere, preferably hydrogen or vacuum. The sintering temperature and sintering pressure depend upon which sintering technique is used. When hot pressing, a sintering temperature between 1600°–2000° C. is required and the sintering pressure is in the range of 20–50 MPa. When HIP sintering, a sintering temperature between 1500°–1800° C. us required and the gas pressure is in the range of 50–200 MPa. When GPS sintering, a sintering temperature between 1600°–2000° C. is normally required and the gas pressure is in the range of 5–20 MPa, preferably 8–12 MPa.

During the sintering of the material, a crystalline phase or phases of transition metal carbide, nitride, carbonitride or silicide is nucleated from the intergranular phase and thus formed in situ. The carbide can be formed due to the existence of carbon monoxide in the furnace atmosphere originating from the graphite parts and residual oxygen or oxides in the furnace. It is also possible to use gas mixtures of nitrogen and carbon monoxide. The crystalline phases reduce the amount of the glassy intergranular phase and formation of a relatively small amount of at least one in situ formed crystalline transition metal compound of this type has now surprisingly been found to increase the wear resistance of the final material. In case of certain combinations of additives and sintering temperatures, crystalline silicon based oxides or oxynitrides such as $Si_2N_2O$ or $Y_2SiO_7$ can also be formed. By changing sintering atmosphere, temperature and amount and starting composition of the intergranular phase, the type of in situ formed secondary transition metal phase can be affected. It is with the purview of the skilled artisan using other raw materials and equipment, taking thermodynamic considerations into account, to determine the conditions by experiments.

The sintered body is ground to an insert with the desired shape and size. The body can be either ground on all surfaces (top, bottom, clearance surface) or on only one, two or three of the surfaces. The unground surfaces will thus be used as sintered. The completely ground or partly ground or unground insert is either honed or provided with a chamfer. Finally, the insert may be provided with a wear resistant layer using either CVD technique (including MT-CVD) or PVD technique, as known in the art. The layer thickness should be in the range of 1–20 µm, preferably 1–10 µm, and most preferably 2–7 µm. Preferably, the layer should consist of a 1–7 µm, preferably 1–5 µm, $Al_2O_3$ layer and a less than 4 µm, preferably 2 µm, thick TiN layer. When the refractory layer is applied, the insert is edge treated to reduce the coating thickness at the edge and to get a smoother coating surface.

The invention is additionally illustrated in connection with the following Examples which are to be considered as illustrative of the present invention. It should be understood, however, that the invention is not limited to the specific details of the Examples.

EXAMPLE 1

The silicon nitride (98 weight %, UBE SN-E10) and 1 weight % yttria (H.C. Starck, min. 99.8% purity by weight) and 0.5 weight % alumina (Sumitomo, AKP30) were added together with 0.5 weight % niobium oxide (H.C. Starck chemically pure grade, min. 99.8% by weight), and milled for 36 hours in water with silicon nitride cylindrical pebbles as a milling media and together with suitable dispersing agents and pressing aids. After milling, the dispersion was sieved and granulated. The granulated powder was then pressed uniaxially to green bodies of the desired geometry.

In order to remove the organic additives, the green bodies were heated in hydrogen at 600° C. for 4 hours. The presintered bodies were then sintered in a GPS furnace with a sintering temperature of 1850° C. under a nitrogen pressure of 20 bar for one hour under which the material reached closed porosity. The pressure was then raised to 100 bar and maintained for one hour. The microstructure of the sintered material can be seen in the FIGURE. The sintered material consisted of beta-$Si_3N_4$ grains, about 25% of which were eongated, with an aspect ratio of >3 with less than 3 weight % intergranular phase. The porosity was 0.1 %. About 1 weight % of $NbSi_2$ with an average size of about 0.5 μm was evenly distributed in the microstructure. The inserts were then ground to SNGN 120412 T02520 geometries and tested in an intermittent cutting operation in grey cast iron with cast skin (600 m/min, 0.25 mm/rev, cutting depth 2 mm). The flank wear after 24 minutes is listed in Table 1, together with the hardness of the material.

EXAMPLE 2

According to the above-described procedure, $Si_3N_4$ (97.65 weight %, UBE SN-E10), $Y_2O_3$ (1 weight %), $Al_2O_3$ (0.5 weight %) and $Ta_2O_5$ (0.85 weight %) were processed and sintered at 1850° C. under a nitrogen pressure of 20 bar for one hour under which the material reached closed porosity. Then, the nitrogen pressure was raised to 100 bar for another hour for the final densification. The sintered material consisted of beta-$Si_3N_4$ grains, about 20% of which were elongated, with an aspect ratio of >5 with <4 weight % intergranular phase. The porosity was 0.1 %. Less than 1 weight % of $TaSi_2$ with an average size of about 1 μm was evenly distributed in the microstructure. The inserts were then ground to SNGN 120412 T02520 geometries and tested in an intermittent cutting operation in grey case iron with cast skin (600 m/min, 0.25 mm/rev, cutting depth 2 mm). The flank wear after 24 minutes is listed in Table 1, together with the hardness of the material.

EXAMPLE 3

According to the above-described procedure, $Si_3N_4$ (97 weight %, UBE SN-E10), $Y_2O_3$ (1 weight %), $Al_2O_3$ (0.5 weight %) and $Nb_2O_5$ (1.5 weight %) were processed and sintered at 1850° C. under a nitrogen pressure of 20 bar for one hour under which the material reached closed porosity. Then, the nitrogen pressure was raised to 100 bar for another hour for the final densification. The sintered material consisted of beta-$Si_3N_4$ grains, about 15 % of which were elongated, with an aspect ratio of >5 with about 2 weight % intergranular phase. The porosity was 0.3 %. About 2 weight % of $NbSi_2$ with an average size of <1 μm was evenly distributed in the microstructure. The inserts were then ground to SNGN 120412 T02520 geometries and tested in an intermittent cutting operation in grey cast iron with cast skin (600 m/min, 0.25 mm/rev, cutting depth 2 mm). The flank wear after 24 minutes is listed in Table 1, together with the hardness of the material.

EXAMPLE 4

According to the above-described procedure, $Si_3N_4$ (97 weight %, UBE ESP), 1.5 weight % $Y_2O_3$, 0.75 weight % $Al_2O_3$, 1.0 weight % $Nb_2O_5$, 0.25 $SiO_2$ were processed and sintered at 1850° C. under a nitrogen pressure of 20 bar for one hour under which the material reached closed porosity. Then, the nitrogen pressure was raised to 100 bar for another hour for the final densification. The sintered material consisted of beta-$Si_3N_4$ grains, about 20% of which were elongated, with an aspect ratio of >5 with less than 5 weight % intergranular phase. The porosity was <0.2%. Less than 1 weight % of $NbSi_2$ with an average size of less than 1 μm was evenly distributed in the microstructure. The inserts were then ground to SNGN 120412 T02520 geometries and tested in an intermittent cutting operation in grey case iron with cast skin (600 m/min, 0.25 mm/rev, cutting depth 2 mm). The flank wear after 24 minutes is listed in Table 1, together with the hardness of the material.

TABLE 1

| Material | Flank Wear | Hardness HV10 |
| --- | --- | --- |
| Example 1 | 0.22 mm | 1582 |
| Example 2 | 0.20 mm | 1584 |
| Example 3 | 0.19 mm | 1581 |
| Example 4 | 0.23 mm | 1528 |
| Reference #1 (Prior Art) | 0.35 mm | 1443 |
| Reference #2 | 0.35 mm | 1597 |

The reference material #1 is a commercial grade of beta silicon nitride (Coromant Grade CC690). The reference material #2 has the same starting composition as in Example 1, but without transition metal additives. It has also shown a somewhat more brittle behavior.

The results show that a combination of good fracture toughness, thermoshock resistance and wear resistance can be achieved with the said type of silicon nitride material. The material thus shows good wear resistance and the capacity to stand mechanical and thermal stress without leading to catastrophic failures.

EXAMPLE 5

Inserts with the style SNGN 120412 T02520 were manufactured according to Example 3 above. The inserts were divided into three groups, A, B and C, and a refractory coating consisting of layers of $Al_2O_3$ and TiN was applied using CVD technique. The layer thicknesses were according to the following in μm:

TABLE 2

| Insert | $Al_2O_3$ (closest to the insert) | TiN (on top of the $Al_2O_3$ layer) |
| --- | --- | --- |
| 5A | 4 | 1 |
| 5B | 1.5 | 0.5 |
| 5C | reference without refractory coating | |

Finally, all edges of the inserts were treated so as to reduce the coating thickness and to get a smoother coating surface.

The inserts were tested in a turning operation in nodular cast iron (SS0727) with remaining cast skin (600 m/min, 0.25 mm/rev, 2 mm cutting depth). After 3 minutes, the following wear was measured.

TABLE 3

| Inserts | Flank Wear (mm) | Crater Wear Area (mm$^2$) |
| --- | --- | --- |
| 5A | 0.12 | 0.09 |
| 5B | 0.21 | 0.30 |
| 5C | 0.25 | 0.52 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of making a silicon nitride cutting tool insert by powder metallurgical methods comprising the steps of:
   a) preparing a silicon nitride slurry by wet dispersion in water or an organic solvent of silicon nitride powder with powders of yttrium oxide 0.1–5 weight %, aluminum oxide 0.1–5 weight % and one or more transition metal chosen from the group consisting of: niobium oxide, tantalum oxide and mixtures thereof in an amount of 0.1–5 weight %, whereby the total sum of added oxides is less than 6 weight %, and dispersing agents;
   b) drying the slurry;
   c) granulating the dried slurry to form a powder;
   d) shaping the powder to form a cutting tool insert shape; and
   e) sintering the cutting tool insert shape using a pressure assisted sintering technique to form a sintered cutting tool insert, and in situ forming at least one secondary crystalline phase comprising at least one carbide, nitride, carbonitride or silicide of niobium, tantalum or mixtures thereof which is nucleated from an intergrannular phase during sintering.

2. The method of claim 1 wherein the yttrium oxide is 0.2–3 weight %.

3. The method of claim 1 wherein the aluminum oxide is 0.1–3 weight %.

4. The method of claim 1 wherein the niobium oxide or tantalum oxide or mixtures thereof is 0.2–3 weight %.

5. The method of claim 1 wherein $SiO_2$ is added in an amount less than 1 weight %.

6. The method of claim 1 wherein a wear resistant coating is deposited on the insert.

7. The method of claim 6 wherein said coating consists of a 1–7 μm $Al_2O_3$ layer and a <4 μm thick TiN layer.

8. The method of claim 1 further comprising adding one or more pressing aid, to the slurry.

9. The method of claim 1, wherein 0.05 to 3.0 weight % of the secondary crystalline phase is formed.

10. The method of claim 1, wherein 0.3 to 2.0 weight % of the secondary crystalline phase is formed.

11. The method of claim 1, wherein the sintered cutting tool insert comprises beta silicon nitride.

12. The method of claim 1, wherein the sintered cutting tool insert comprises elongated beta silicon nitride grains having an aspect ratio greater than 3.

13. The method of claim 1, wherein the sintered cutting tool insert comprises elongated beta silicon nitride grains having an aspect ratio greater than 5.

* * * * *